(12) United States Patent
Lemchak et al.

(10) Patent No.: US 10,911,605 B2
(45) Date of Patent: Feb. 2, 2021

(54) PROVISIONING A TRIAL SERVICE TO A MOBILE DEVICE

(71) Applicant: Verizon Patent and Licensing Inc., Arlington, VA (US)

(72) Inventors: Paul Lemchak, Wayne, NJ (US); Bindu Balan, Basking Ridge, NJ (US); Thuha T. Cung; Dale M. Gibson, North Brunswick, NJ (US); Chaoying Zhu, Basking Ridge, NJ (US); Kobie Thakar, Pelham, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 29 days.

(21) Appl. No.: 16/136,916

(22) Filed: Sep. 20, 2018

(65) Prior Publication Data
US 2019/0020764 A1    Jan. 17, 2019

Related U.S. Application Data

(62) Division of application No. 14/496,108, filed on Sep. 25, 2014, now Pat. No. 10,110,754.

(51) Int. Cl.
*H04M 3/42*     (2006.01)
*H04M 15/00*    (2006.01)
*H04L 29/08*    (2006.01)
*H04L 12/58*    (2006.01)
*H04W 4/24*     (2018.01)

(52) U.S. Cl.
CPC ........ *H04M 15/8094* (2013.01); *H04L 51/18* (2013.01); *H04L 67/20* (2013.01); *H04M 3/42289* (2013.01); *H04W 4/24* (2013.01); *H04M 2207/18* (2013.01)

(58) Field of Classification Search
CPC . G06Q 30/02; G06Q 30/0207; G06Q 30/0235
See application file for complete search history.

(56) References Cited

U.S. PATENT DOCUMENTS

| | | | |
|---|---|---|---|
| 5,708,709 A * | 1/1998 | Rose | G06F 8/61 380/30 |
| 6,996,599 B1 * | 2/2006 | Anders | G06F 8/61 707/E17.032 |

(Continued)

OTHER PUBLICATIONS

NPL dated Oct. 21, 2013 and titled "Ditch your ISP's modem and change your Internet experience forever" by Eric Geier.*

(Continued)

*Primary Examiner* — Lynn D Field
*Assistant Examiner* — Richard A McCoy

(57) ABSTRACT

A method, a device, and a non-transitory storage medium provide for receiving a request to provision a trial service to a user device, wherein the trial service includes providing a premium service to the user device during a trial time period; identifying a class of service provided to the user device, wherein the request is denied when the premium service is provided to the user device; determining whether the user device is eligible to receive the premium service; determining, when the user device is eligible to receive the premium service, whether the user device is eligible to receive the trial service; and provisioning, based on determining that the user device is eligible to receive the trial service, the trial service to the user device.

20 Claims, 11 Drawing Sheets

(56) References Cited

U.S. PATENT DOCUMENTS

| | | | | |
|---|---|---|---|---|
| 7,899,706 B1* | 3/2011 | Stone | G06Q 30/02 705/14.51 |
| 9,367,863 B2* | 6/2016 | Cassell | G06Q 30/04 |
| 2002/0143568 A1* | 10/2002 | Nakamura | G06Q 10/10 705/1.1 |
| 2005/0027616 A1* | 2/2005 | Jones | G06F 21/10 705/26.3 |
| 2006/0123117 A1* | 6/2006 | Heutchy | G06F 21/10 709/227 |
| 2007/0067243 A1* | 3/2007 | Malik | G06Q 30/06 705/59 |
| 2007/0067301 A1* | 3/2007 | Malik | G06F 21/10 |
| 2007/0168288 A1* | 7/2007 | Bozeman | G06F 21/10 705/51 |
| 2007/0288565 A1* | 12/2007 | Wonnacott | H04L 67/104 709/204 |
| 2008/0051069 A1* | 2/2008 | Chin | H04M 15/00 455/414.1 |
| 2008/0091528 A1* | 4/2008 | Rampell | G06Q 30/0267 705/14.1 |
| 2009/0144076 A1* | 6/2009 | Berstis | G04F 1/005 705/14.1 |
| 2009/0259744 A1* | 10/2009 | Kolke | G06F 9/52 709/224 |
| 2010/0100446 A1* | 4/2010 | Kim | G06Q 30/02 705/14.64 |
| 2010/0146380 A1* | 6/2010 | Rousso | G06Q 30/02 715/234 |
| 2011/0010448 A1* | 1/2011 | Gill | G06Q 30/02 709/224 |
| 2011/0125867 A1* | 5/2011 | Denk, Jr. | G06Q 30/02 709/217 |
| 2012/0110568 A1* | 5/2012 | Abel | G06F 8/61 717/178 |
| 2012/0253959 A1* | 10/2012 | Li | G06F 21/105 705/26.1 |
| 2013/0100242 A1* | 4/2013 | Canitz | G06T 15/005 348/43 |
| 2013/0125024 A1* | 5/2013 | Timlin | G06Q 30/0261 715/753 |
| 2013/0318582 A1* | 11/2013 | McCann | G06F 21/41 726/7 |
| 2014/0123065 A1* | 5/2014 | Bos | G06F 3/0237 715/816 |
| 2014/0237084 A1* | 8/2014 | Takahata | H04W 4/80 709/219 |
| 2014/0289831 A1* | 9/2014 | Prakash | H04L 9/3228 726/7 |
| 2014/0342339 A1* | 11/2014 | Kapoor | G09B 7/02 434/322 |
| 2015/0253937 A1* | 9/2015 | Kim | G06F 3/0488 715/765 |
| 2015/0301982 A1* | 10/2015 | Martini | G06F 15/177 709/220 |

OTHER PUBLICATIONS

"_Npl 1 docsis 2 v 3.pdf" dated Jun. 12, 2014 including still shots captured at the time indicated on the video control bar from a YouTube Video at address: https://youtu.be/GkVrEr91SvY authored by Bri Duncan.*

"_Npl 2 3g v 4g.pdf" dated Feb. 16, 2014 including still shots captured at the time indicated on the video control bar from a YouTube Video at address: https://youtu.be/sgSfr80fxXI authored by Troxy BeChannel.*

* cited by examiner

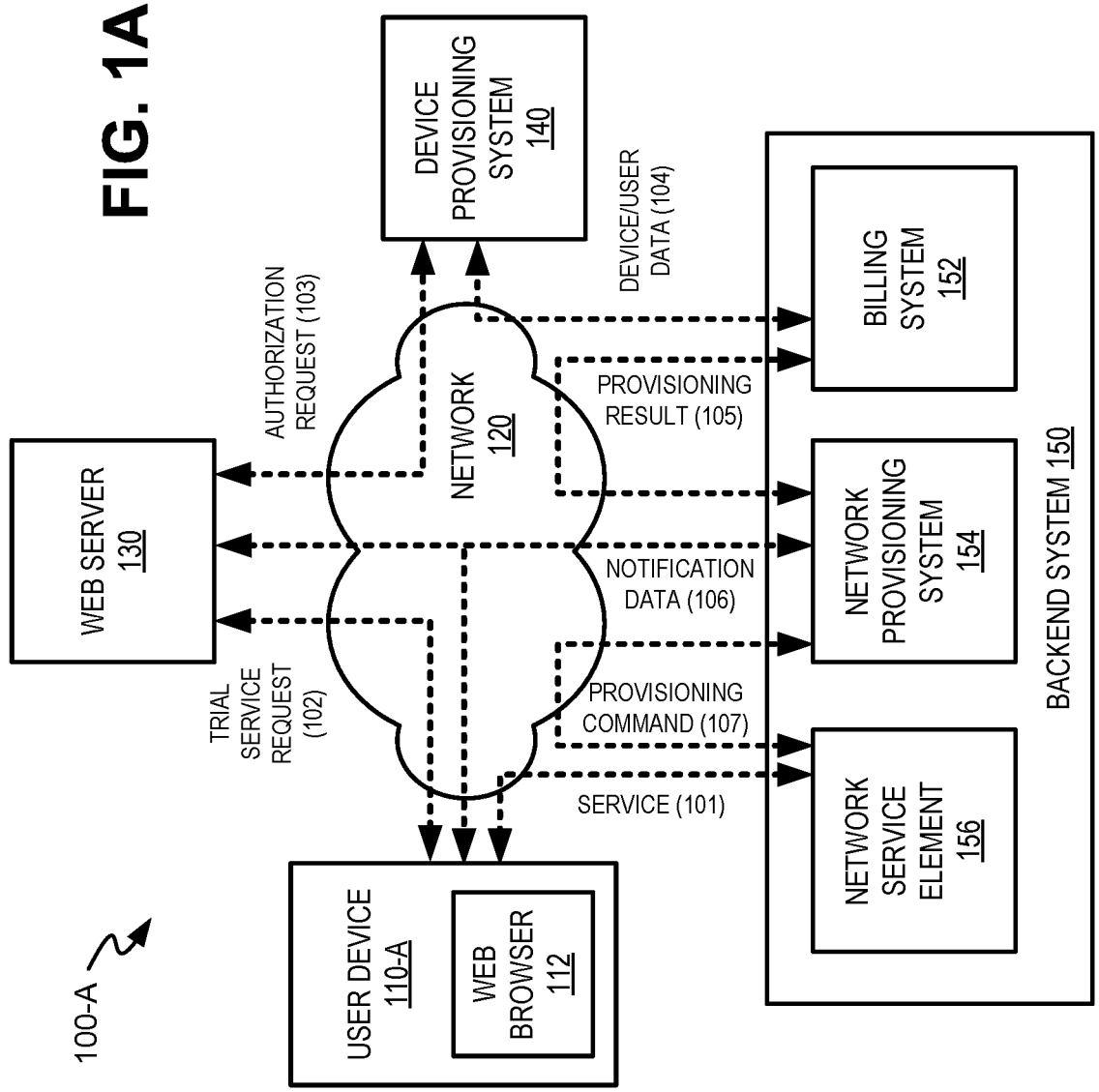

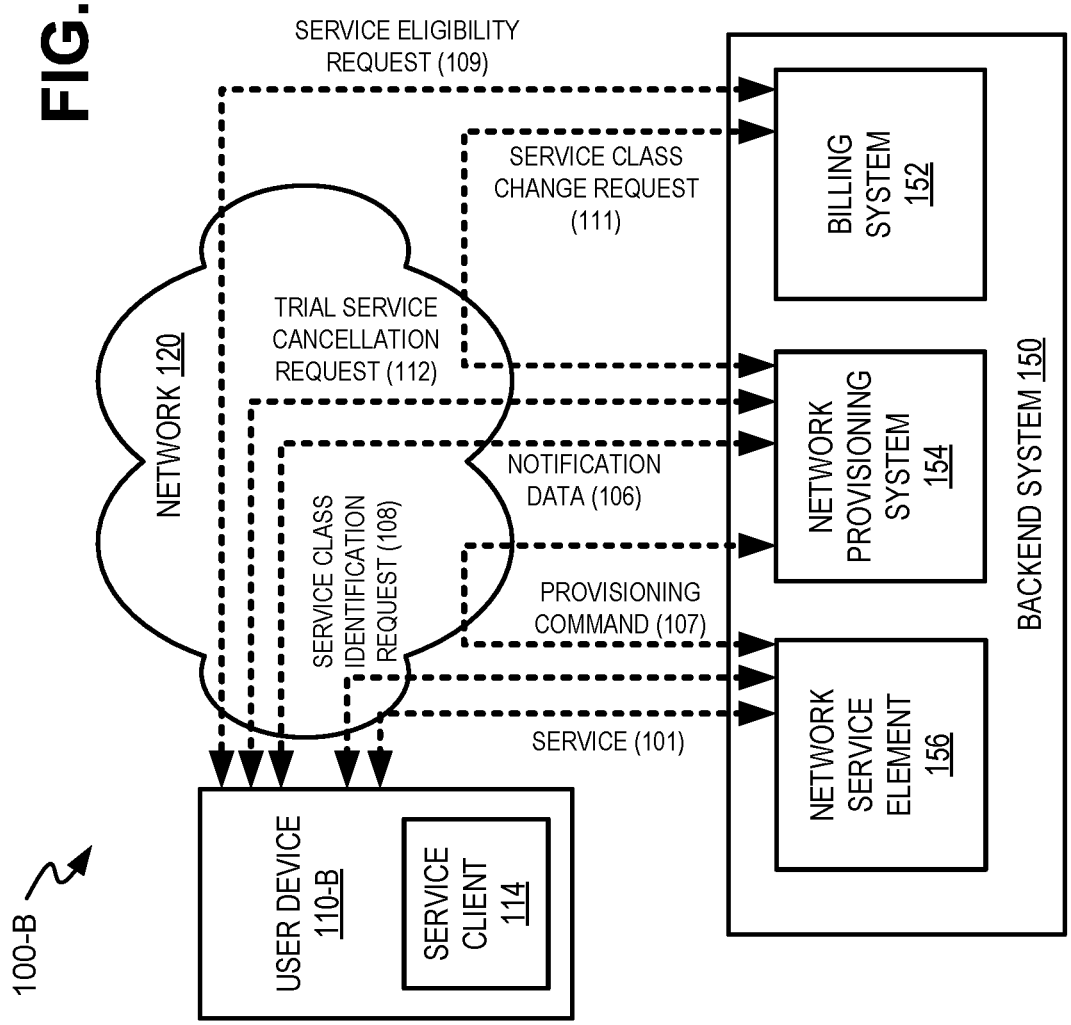

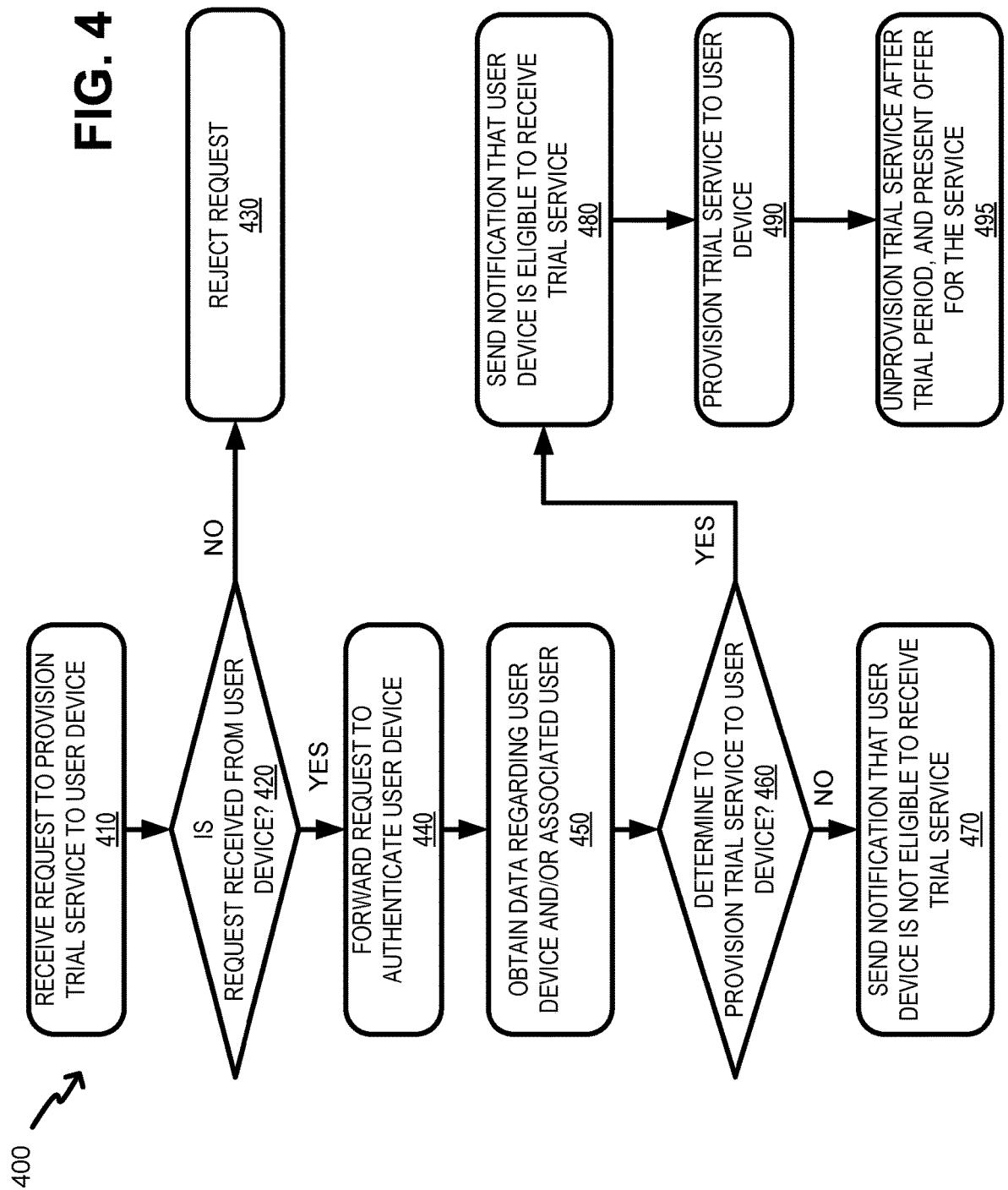

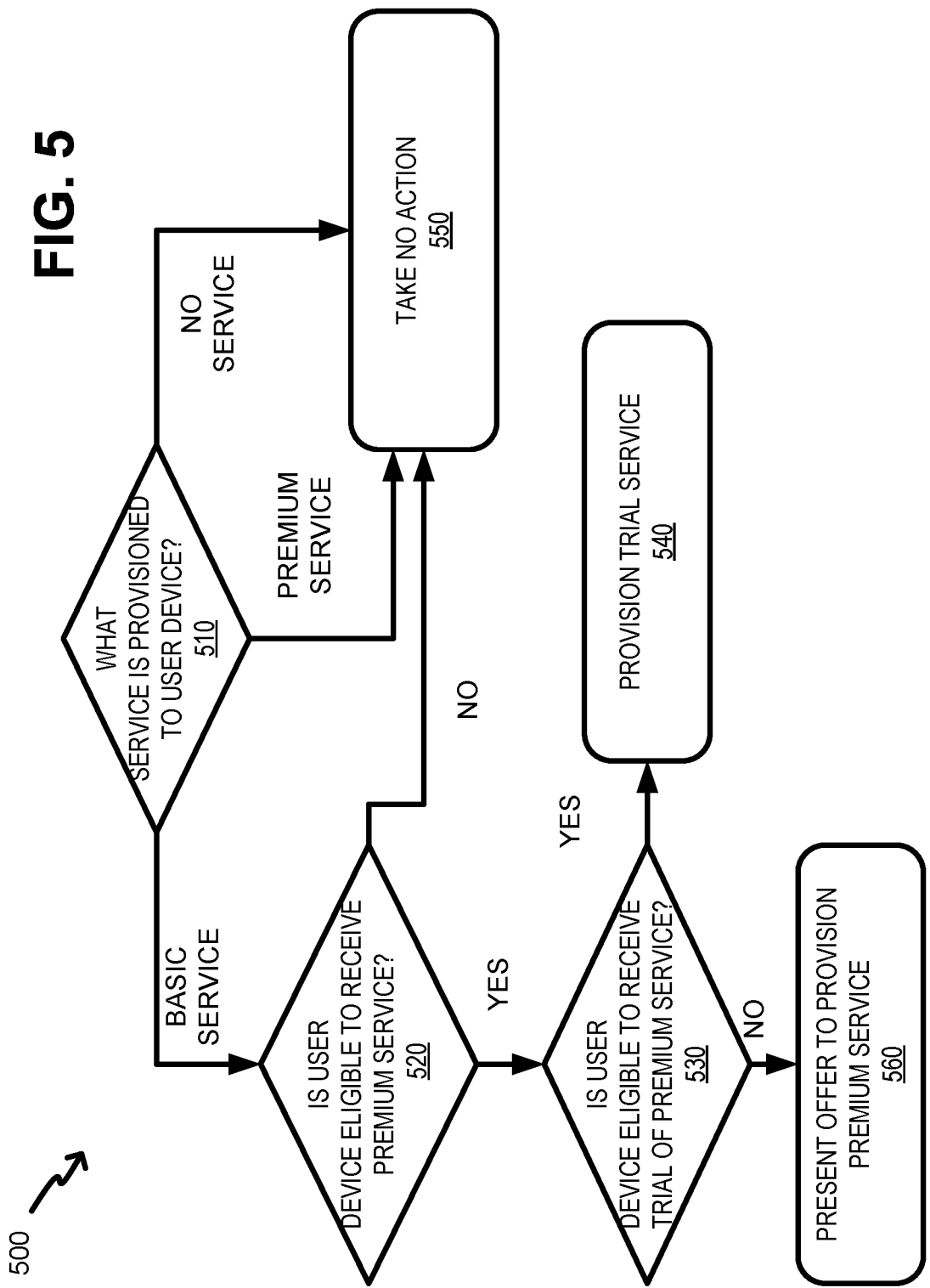

PROVISIONING A TRIAL SERVICE TO A MOBILE DEVICE

CROSS REFERENCE TO RELATED APPLICATION

This application is a divisional of U.S. patent application Ser. No. 14/496,108 filed on Sep. 25, 2014, the disclosure of which is hereby incorporated herein by reference in its entirety.

BACKGROUND

When a wireless device, such as a smart phone, is activated, various services and features associated with the wireless device may be provisioned. Certain optional services features may be available through the wireless device. Offering a trial, or sample, access to a service (or level of service) may allow a user to experience the service without committing to purchasing the service.

BRIEF DESCRIPTION OF THE DRAWINGS

FIGS. 1A and 1B are diagrams of an exemplary system 100 to enable self (e.g., user-initiated) activation of a service or an upgraded class of the service during a trial period according to an implementation described herein;

FIG. 4 is a flow chart of an exemplary process for provisioning a trial service according to an implementation described herein; and FIG. 5 is a flow chart of an exemplary process for determining whether a user device is eligible to receive a trial service according to an implementation described herein.

DETAILED DESCRIPTION OF PREFERRED EMBODIMENTS

Figure 2:
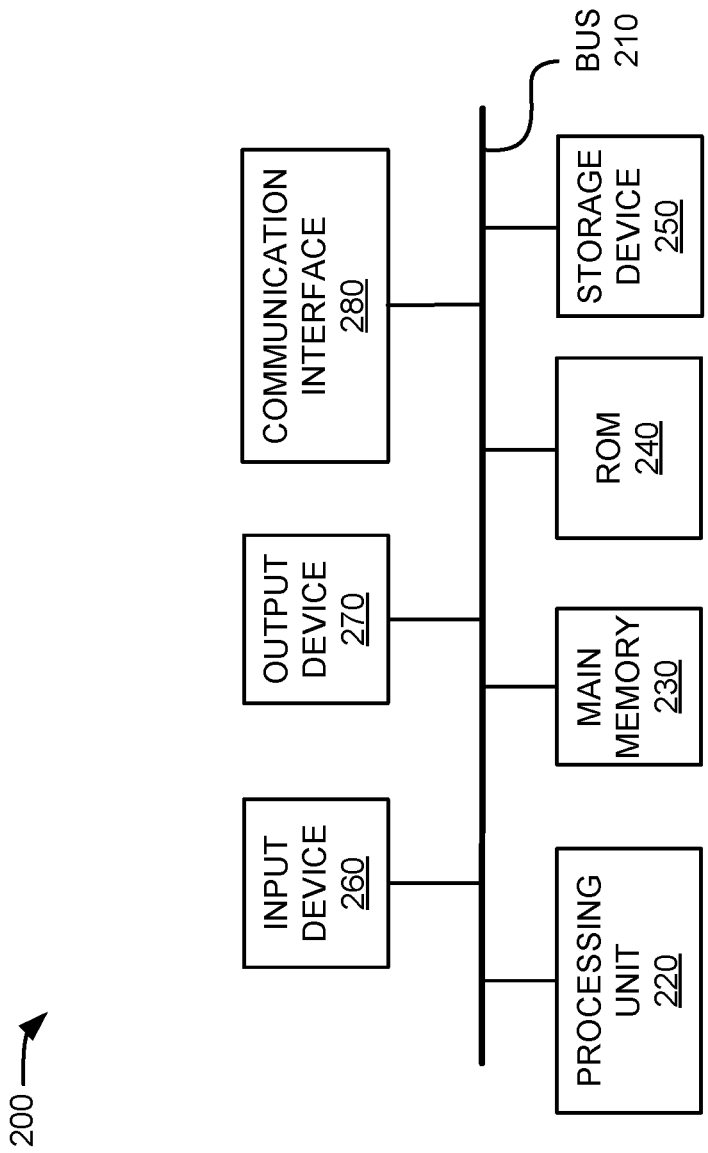
FIG. 2 is a diagram of exemplary components of one or more devices of the trial services provisioning systems illustrated in FIGS. 1A and 1B according to an implementation described herein.

The following detailed description refers to the accompanying drawings. The same reference numbers in different drawings may identify the same or similar elements.

Systems and/or methods described herein may relate to handling a request for a trial service. The request to provision a trial service to a user device is received, and the trial service may relate to offering a service to the user device during a trial time period. The request is confirmed as originating from the user device by forwarding a confirmation code to the user device, and receiving the confirmation code from the user device in connection with the code. Data regarding the user device is obtained and used to determine whether the user device is eligible to receive and/or capable of receiving the associated service and the trial service.

For example, eligibility of the user device to receive the trial service may be determined based on a current service or type of service provided to the user device before the request is received, based on whether the user device has previously received the trial service; and based on whether an associated user has authority to accept the trial service. When the user device is eligible to receive the trial service, the trial service may be provisioned to the user device. When the trial period ends, the trial service may be automatically un-provisioned so that the user device cannot continue to receive the trial service, and the user device may present information to enable the user device to receive and/or purchase a service associated with trial service on a more permanent basis. For example, the user device may display a text message, received from a provisioning server, which includes instructions for requesting the service after the trial period ends.

FIGS. 1A and 1B are diagrams of an exemplary system 100 (shown in FIG. 1A and system 100-A and in FIG. 1B as system 100-B) to enable self (e.g., user-initiated) activation of a service or a upgraded class of the service during a trial period (hereafter referred to as a trial service 101). System 100-A in FIG. 1A relates to web-based provision of trial service 101. As shown in FIG. 1A, system 100 may include a user device 110-A, a network 120, a web server 130, a device provisioning system 140, and a backend system 150 that includes a billing system 152, a network provisioning system 154, and network service element 156. As used herein, the term "user device" is intended to be broadly interpreted to include the actual user device or an associated user of the user device.

Components of system 100-A may be interconnect via wired and/or wireless connections or links. A single one of each of user device 110-A, network 120, web server 130, device provisioning system 140, backend system 150, billing system 152, network provisioning system 154, and network service element 156 is illustrated in FIG. 1A for simplicity. In practice, there may be a plurality of user devices 110, networks 120, web servers 130, device provisioning systems 140, backend systems 150, billing systems 152, network provisioning systems 154, and/or network service elements 156 in system 100-A. Also, in some instances, one or more of the components of system 100-A may perform one or more functions described as being performed by another one or more of the components of system 100-A.

User device 110 (shown in FIG. 1A as user device 110-A) may include a device capable of receiving trial service 101. User device 110 may include, for example, a portable computing and/or communications device, such as a personal digital assistant (PDA), a smart phone, a cellular phone, a laptop computer with connectivity to a cellular wireless network, a tablet computer, a wearable computer, etc. User device 110 may also include non-portable computing devices, such as a desktop computer, consumer or business appliance, set-top devices (STDs), or other devices that have the ability to connect to network 120. User device 110 may connect to network 120, for example, through a wireless radio link to obtain data and/or voice service.

In the example shown in FIG. 1A, user device 110 may include a web browser 112 such as Internet Explorer® by Microsoft Corp., Firefox® by Mozilla Corp., Chrome® by Google Inc., Safari by Apple Inc., Opera by Opera Software ASA, etc. Web browser 112 may include a software application, operating on user device 110, for retrieving and presenting information resources via network 120. The information resource may correspond to a web page, image, video or other piece of content identified by a uniform resource identifier (URI), also referred to as a uniform resource locator (URL).

In one implementation, user device 110 may forward a trial service request 102 to web server 130 to request provisioning, during a trial period, of a service provided by network service element 156. For example, web browser 112 may request, via network 120, data associated with a URI to access a web page for requesting trial service 101. Web browser 112 may forward the URI based on user device 110 receiving a user input, such a mouse click or other input, regarding another web page presenting an advertisement or information related to trial service 101.

In another implementation, user device 110 may forward a request for provisioning trial service 101 without using web browser 112. For example, trial service request 102 may be sent via a short messaging system (SMS), e-mail, or other communication from user device 110. In another example, user device 110 may include an application, such as service client 114 (shown in FIG. 1B) that executes commands to forward trial request 102

Network 120 may include one or more wireless or wired networks. For example, network 120 may include one or more devices that include radio interfaces to provide wireless connections to user device 110. In one implementation, network 120 may include a long term evolution (LTE), another fourth generation (4G) network, or another radio access network for a cellular network (such as 3G, 2.5G, 2G, 1G, etc.). For example, network 120 may include one or more base stations, which, in the context of an LTE network, may be referred to as an Evolved Node B (eNodeB). Each eNodeB may provide a radio interface over which the eNodeB may communicate with user device 110. The radio interfaces provided by network 120 may include, for example, orthogonal frequency-division multiplexing (OFDM) and/or single-carrier frequency-division multiple access (SC-FDMA) based radio interfaces.

In another implementation, network 120 may include one or more data networks, such as a local area network (LAN), a WAN, and/or a metropolitan area network (MAN). Network 120 may be implemented using an internet-protocol (IP) based network architecture that includes one or more network devices or components that facilitate the providing of network access to user device 110. Network 120 may connect to one or more other networks, such as to the Internet, to provide network service to user device 110.

Web server 130 may exchange data with user device 110 via network 120 based on receiving trial service request 102. Web server 130 may be a computing device that delivers (e.g., serves) web content, such as Web pages, to user device 110 via network 120. Web server 130 may be associated with an IP address and possibly a domain name. Web server 130 may include web serving software, such as Apache® of Apache Software Foundation, Internet Information Services (IIS) by Microsoft Corp., Nginx by Nginx, Inc., or Google Web Server (GWS) by Google, Inc., to deliver web content via network 120 for presentation by web browser 112.

Web server 130 may provide a front-end interface that provides information to user device 110 regarding trial service 101 and may collect and process user inputs. In one implementation, web server 130 may forward, to user device 110 and based on receiving trial service request 102, a request (e.g., a web page) for data regarding user device 110 and/or an associated user. The data regarding user device 110 may include, for example, information identifying a device type, a model number, a manufacturer, a mobile directory number (MDN), a mobile identification number (MIN), an international mobile subscriber identity (IMSI), an electronic serial number (ESN), an international mobile equipment identity (IMEI), an operating system, a type of web browser 112, etc. The requested data regarding the associated user may include, for example, a user identifier (e.g., the user's name), an account number, a user type, address, or additional data, such as a credit card number or other payment information.

In one implementation, web server 130 may dynamically generate or select the web page based on receiving trial service request 102. For example, the web page may be formatted to be compatible with user device 110 (e.g., compatible with web browser 112). In this example, the web page may include a cascade style sheet (CSS) or other formatting data that enables the web page to be presented on user device 110, but may not be compatible with other user devices (not shown). For example, the CSS may be specifically configured to enable the web page to be displayed on the particular user device 110 (e.g., compatible with a resolution of an associated display device), but the CSS setting may prevent another type of user device from displaying the web page.

In another example, web server 130 may forward a URI that enables only a particular user device 110 to access the web page associated with trial service request 102. For example, the URI may include an extension identifying a session between user device 110 and web server 130. Additionally or alternatively, the URI may include data identifying the particular user device 110, and network 120 and/or web server 130 may selectively enable only the particular user device 110 to access the web page. If another user device attempts to use the URI, network 120 and/or web server 130 may prevent access to the web page by the other user device.

In one implementation, web server 130 may further cause authentication data to be exchanged with user device 110. For example, web server 130 may initiate sending, to user device 110, an SMS message (or other communication) that includes authenticating data, such as an alphanumeric code, and web server 130 may further use the authenticating data to verify that trial service request 102 is received from user device 110. For example, trial service request 102 may include the authentication data to enable web server 130 to verify that trial service request 102 is received from user device 110.

Web server 130 may generate an authentication request 103 based on the contents include in or associated with trial service request 102 (e.g., data received in a populated web page requesting trial service 101). For example, web server 130 may populate a blank form using data obtained via trial service request 102 to generate authentication request 103.

Device provisioning system 140 may include a component that configures other components of system 100 that so that system 100 may provide various communications and/or data services (e.g., trial service 101) to user device 110. In one implementation, device provisioning system 140 may receive and parse authentication request 103 to obtain device/user data 104 regarding user device 110 and/or the associated user.

Device provisioning system 140 may forward device/user data 104 to backend system 150, and a component of backend system 150 (e.g., billing system 152) may further determine, based on device/user data 104, whether user device 110 is eligible to receive trial service 101. Backend system 150 may include components that provide and administer trial service 101, such as billing system 152, network provisioning system 154, and network service element 156.

For example, billing system 152 (also known as a self-provisioning gateway (SPG) may process device/user data 104 to determine whether user device 110 is compatible with (e.g., able to use) trial service 101. In another example, billing system 152 may use device/user data 104 to identify user device 110 and may determine whether the identified user device 110 is eligible to receive trial service 101. For example, device billing system 152 may verify the user device 110 has not previously received trial service 101 (or had not received the trial service within a particular period of time), and/or that an associated user is eligible to receive trial service 101. For example, billing system 152 may determine that user device 110 is eligible to receive trial service 101 if user device 110 is associated with an appropriate service subscription type. For example, trial service 101 may be available to a residential customer, but not available to a business customer. Billing system 152 may forward provisioning result 105 to network provisioning system 154, and provisioning result 105 may include data indicating whether user device 110 is eligible to receive trial service 101.

Network provisioning system 154 may store information regarding network resources related to service 101. For example, network provisioning system 154 may store information regarding network service element 156 (e.g., switches, gateways, routers, etc.) available to a service provider to provision trial service 101. For example, if trial service 101 relates to a visual voice mail service (e.g., to provide a visual representation of an audio voice mail data), network service element 156 may include a voice mail server to store and retrieve the voice mails. In another example, if trial service 101 relates to enhanced caller identification (caller ID), network service element 156 may include a caller ID server to tag communications with additional data (e.g., a name, location, image, etc., of a party associated with an incoming call) which may vary based on the capabilities of user device 110.

When network provisioning system 154 receives provisioning result 105 indicating that user device 110 is eligible to receive trial service 101, network provisioning system 154 may provide notification data 106 indicating that trial service request 102 has been approved. For example, web server 130 may forward, to user device 110, a web page or other data indicating that trial service 101 will be provisioned to user device 110. When network provisioning system 154 receives provisioning result 105, network provisioning system 154 may further forward provisioning command 107 to network service element 156. Provisioning command 107 may cause network element 156 to provide trial service 101 to user device 110 during an associated trial period. Provisioning command 107 may include, for example, data identifying user device 110, trial service 101, the trial period, etc., and network service element 156 may use the information in provisioning command 107 to provide trial service 101 to user device 110.

After the trial period expires, network provisioning system 154 may update provisioning command 107 to end access, by user device 110 to trial service 101. For example, provisioning command 107 may cause network service element 156 to provide trial service 101 to user device 110 during a time period and to cease providing service 101 after the time period expires. After the time period expires, network provisioning system 154 may further update notification data 106 to reflect the expiration of trial service 101. For example, notification data 106 may be updated to inform user device 110 that trial service 101 has expired. Notification data 106 may be further updated to enable user device 110 to request permanent access to trial service 101 (e.g., to accept an associated subscription fee).

In another implementation shown in FIG. 1B, system 100-B may relate to automatically provisioning trial service 101, such as to provide temporary and free access to an upgraded, higher or different level of service to a user device 110 that normally receives lower (e.g., basic) level of service. As shown in FIG. 1B, system 100-B may include, for example, user device 110 (shown in FIG. 1B as user device 110-B) that includes a service client 114, network 120, backend system 150, billing system 152, network provisioning system 154, and network service element 156.

Components of system 100-B may interconnect via wired and/or wireless connections or links. A single one of each of user device 110, service client 114, network 120, backend system 150, billing system 152, network provisioning system 154, and network service element 156 is illustrated in FIG. 1B for simplicity. In practice, there may be a plurality of user devices 110, service clients 114, networks 120, backend systems 150, billing systems 152, network provisioning systems 154, and/or network service elements 156 in system 100-B. Also, in some instances, one or more of the components of system 100-B may perform one or more functions described as being performed by another one or more of the components of system 100-B.

Service client 114 may include an application, such as a mobile application, executed by user device 110 in connection with automatically requesting trial service 101. For example, service client 114 may receive and process user inputs related to accessing trial service 101. Service client 114 may further provide an interface for receiving and presenting data related to trial service 101. Service client 114 may receive a request for trial service 101. Alternatively, service client 114 may automatically initiate the request for trial service 101 when user device 110 and/or service client 114 is initially activated, or based on certain actions (e.g., based on determining that user device 110 is using at least a threshold amount of the basic, lower level of service).

User device 110 may forward (e.g., via service client 114) service class identification request 108 to network service element 156. Service class identification request 108 may request network service element 156 to identify a class of service provided by network service element 156 to user device 110. Network service element 156 may determine the class of service provided by network service element 156 to user device 110 based on, for example, examining registration and/or billing data associated with user device 110.

User device 110 may forward a service eligibility request 109 to billing system 152. Service eligibility request 109 may include, for example, data identifying user device 110 and its associated class of service. Billing system 152 may parse service eligibility request 109 and use the parsed data and/or other data regarding user device 110 or the currently provisioned service to determine an appropriate action regarding whether to provision trial service 101 (e.g., the upgraded level of service). For example, Table 1 (shown below) shows exemplary actions that may be initiated by billing system 152 based on data extracted from eligibility request 109, such as (1) a current class of service (as determined from service class identifying request 108) provided to user device 110, (2) whether user device 110 (or the associated user) is eligible for the premium class of service, and (3) whether user device 110 (or the associated user) is eligible for a trial of the premium class of service. For example, billing system 152 may determine whether user device 110 is compatible with or capable of receiving the premium class of service and/or whether user device 110 is permitted (e.g., associated with an appropriate service agreement) to receive the premium class of service. If trial service 101 relates to a visual voice mail service, billing system 152 may determine whether a display associated with user device 110 supports (e.g., processes an associated encoding scheme, supports a resolution, etc.) displaying the visual voice mail data. In another example, billing system 152 may determine whether user device 110 is associated with a business account that would not be eligible to receive the premium class of service. Billing system 152 may further determine whether user device 110 is eligible for the trial of the premium class of service. For example, billing system 152 may determine that user device 110 is eligible for trial service 101 if user device 110 (or another device associated with the user) has not previously received trial service 101.

TABLE 1

| CURRENT CLASS OF SERVICE | PREMIUM SERVICE ELIGIBLITY | ELIGIBLITY FOR TRIAL OF PREMIUM SERVICE | ACTION |
| --- | --- | --- | --- |
| BASIC SERVICE | ELIGIBLE | ELIGIBLE | AUTOMATICALLY PROVISION TRIAL OF PREMIUM SERVICE CLASS |
| BASIC SERVICE | ELIGIBLE | NOT ELIGIBLE | OFFER PREMIUM SERVICE CLASS |
| BASIC SERVICE | NOT ELIGIBLE | NOT ELIGIBLE | TAKE NO ACTION |
| PREMIUM SERVICE | DO NOT CHECK FOR ELIGIBILITY | | TAKE NO ACTION |
| TRIAL OF PREMIUM SERVICE | DO NOT CHECK FOR ELIGIBILITY | | TAKE NO ACTION |
| TRIAL DOES NOT RECEIVE SERVICE | DO NOT CHECK FOR ELIGIBILITY | | TAKE NO ACTION |

In the exemplary actions shown in Table 1, billing system 152 may determine to take no action regarding providing or offering trial service 101 (e.g., a trial of the premium class of service) if user device 110 is either already receiving the premium class of service or is already receiving trial service 101. Additionally, billing system 152 may determine to take no action regarding trial service 101 if user device 110 does not receive any class (or type) of the associated service or user device 110 is not compatible with the premium class of service. In the example represented in Table 1, billing system 152 may also determine to automatically (e.g., without receiving a request or other input from user device 110) provision trial service 101 if user device 110 receives the basic class of a service, is eligible to receive the premium class of service 101, and is further eligible to receive trial service 101. In another exemplary action included in Table 1, billing system 152 may further determine to offer (e.g., present an advertisement for) the premium class of service if user device 110 is receiving the basic class of service, is eligible to receive the premium class of service, and is ineligible to receive trial service 101 (e.g., the user has previously received trial service 101).

In other implementation, additional factors may be considered when determining whether user device 110 is eligible to receive trial service 101. For example, a location associated with user device 110 (e.g., a cell in WLAN included in network 120) may be identified, and user device 110 may be eligible to receive trial service 101 when the associated location supports (e.g., is able to provide) trial service 101. In another example, a capacity of network service element 156 may be evaluated to determine whether network service element 156 has sufficient capacity to support providing trial service 101 to user device 110. If network service 156 has insufficient capacity (e.g., is unable) to support providing trial service 101 to user device 110, user device 110 may be ineligible to receive trial service 101 at a current time.

Continuing with FIG. 1B, if billing system 152 determines to provide trial service 101 (e.g., temporarily provide the premium class of service) to user device 110, billing system 152 may forward service class change request 111 to network provisioning system 154 to initiate provisioning of trial service 101 to user device 110.

When network provisioning system 154 receives service class change request 111, network provisioning system 154 may forward notification data 106 to user device 110 and provisioning command 107 to network service element 156.

As described above with respect to FIG. 1A, notification data 106 may indicate to user device 110 that trial service 101 is beginning and may further provide related content, such as instructions for accessing trial service 101 and/or an end date for trial service 101.

As previously described, trial service 101 may naturally expire after a particular trial period (e.g., 30 days after the initial provisioning of trial service). Alternatively, user device 110 may forward a trial service cancellation request 112 (e.g., to network provisioning system 154) to end trial service 101 before the end of the trial period. Based on receiving trial service cancellation request 112, network provisioning system 154 may, for example, update notification data 106 to indicate that trial service 101 is being halted before the expiration of the trial period and/or update network provisioning command 107 to cause network service element 156 to cease providing trial service 101.

Although FIGS. 1A and 1B shows exemplary components of system 100 and messages sent within system 100, in other implementations, system 100 may contain fewer components, different components, differently arranged components, or additional components than those depicted in FIGS. 1A and 1B. Furthermore, fewer messages, different messages, differently order messages, or additional messages may be sent than those depicted in FIGS. 1A and 1B.

FIG. 2 is a diagram of exemplary components of a device 200 that may correspond to one or more devices of system 100. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc.

Communication interface 280 may include a transceiver that enables device 200 to communicate with other devices and/or systems. For example, communication interface 280 may include a transceiver for communicating with another device or system via network 120. For example, if user device 110 is a wireless device, such as a smart phone, communication interface 280 may include, for example, a transmitter that may convert baseband signals from processing unit 220 to radio frequency (RF) signals and/or a receiver that may convert RF signals to baseband signals. Alternatively, communication interface 280 may include a transceiver to perform functions of both a transmitter and a receiver. Communication interface 280 may further include an antenna assembly for transmission and/or reception of the RF signals, and the antenna assembly may include one or more antennas to transmit and/or receive RF signals over the air.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. Alternatively, or additionally, one or more components of device 200 may perform one or more other tasks described as being performed by one or more other components of device 200.

Figure 3A:
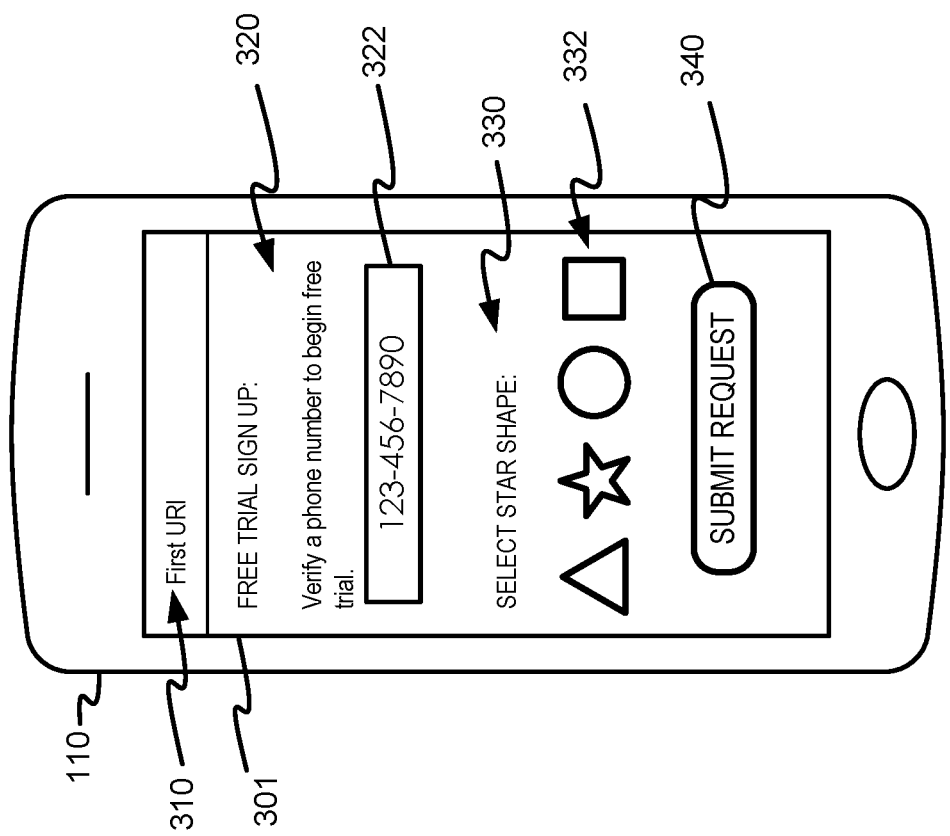
FIGS. 3A-3F are exemplary displays that may be presented by a user device included in the trial service provisioning systems illustrated in FIGS. 1A and 1B.

FIGS. 3A-3F show exemplary displays 301-306 that may be presented by user device 110 in connection request requesting trial service 101. FIG. 3A shows an exemplary first display 301 that may present a web page associated with a first URI 310 for requesting trial service 101. First URI 310 may be generated by web server 130 and may be configured to be usable only by web browser 112 of the user device 110. Web server 130 may provide first URI 310 to user device 110 based on, for example, receiving a request for information regarding providing trial service 101 to user device 110. In another implementation, web server 130 may automatically provide (e.g., without receiving a request) first URI 310 to user device 110 based on detecting a condition in user device 110 and/or another component of system 100. For example, web server 130 may automatically provide first URI 310 to user device 110 when user device 110 is first activated and/or when user device 110 accesses services related to trial service 101 (e.g., a basic level of service that can be upgraded during trial service 101).

As shown in FIG. 3A, a web page associated with first URI 310 may cause a first display 301 to include various requests for data to authenticate that the request for trial service 101 is received by user device 110. For example, first display 301 may include a phone number request 320 to receive a telephone number 322 (shown in FIG. 3A as "123-456-7890") or another identifier associated with user device 110. In FIG. 3A, first display 301 may also include a data entry request 330 to receive data to verify that the request for trial service 101 is received from a user and not from a computer or from malicious software (such as virus) operating on user device 110. For example, data entry request 330 may be a "captcha" that requests a user selection of a shape 332 based on a logical (e.g., textual) clue. In first display 301, after telephone number 322 is specified and an appropriate shape 332 is selected, user device 110 may receive a user input related to a selection of graphical element 340 for submitting the request for trial service 101.

In one implementation, first display 301 may include a graphical user interface (GUI) that enables a user to submit an input related to selecting different possible verification data to provide in connection with requesting trial service 101. For example, the GUI may enable a selection among different first tests to verify that the request for trial service 101 is received from user device 110, and different second tests to verify that the request for trial service 101 is initiated by the associated user.

Figure 3B:
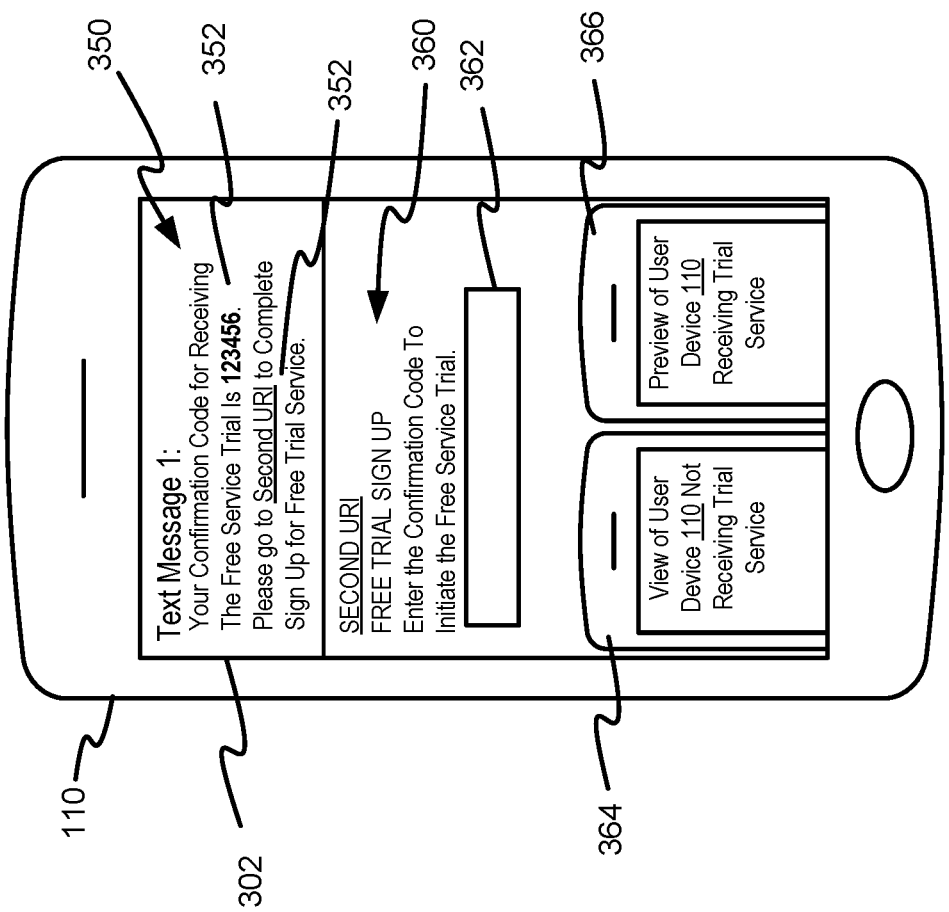

FIG. 3B shows an exemplary second display 302 that may be presented by user device 110 based on verifying the request (e.g., via first display 301). Second display 302 may include, for example, a first text message 350. First text message 350 may include, for example, data identifying a confirmation code 352 (shown in FIG. 3B as "123456"). First text message 350 may further identify a second URL 354.

User device 110 may access a web page associated with second URL 354. As further shown in FIG. 3B, the web page associated with second URL 354 may include, for example, a request 360 for confirmation code 352 and may include a confirmation code input field 362 to receive confirmation code 352 and to initiate trial service 101. In one implementation, first text message 350 (that includes confirmation code 352) and confirmation code input field 362 may be currently presented in second display 302 so that the user can easily identify and provide confirmation code 352.

In one implementation shown in FIG. 3B, second display 302 may further include, for example, a first representation 364 and a second representation 366 of user device 110. First representation 364 may provide a graphical indication of how user device 110 would appear/function when not receiving trial service 101. Second representation 366 may provide a graphical indication of how user device 110 would appear/function when receiving trial service 101. In this way, the user may view how the trial service 101 may modify operation of user device 110. For example, if trial service 101 relates to an enhanced caller identification service, first representation 364 may show user device 110 displaying a phone number associated with an incoming call, and representation 366 may show user device 110 additional data associated with an incoming call, such a name, image, or other attribute of the caller.

Figure 3C:
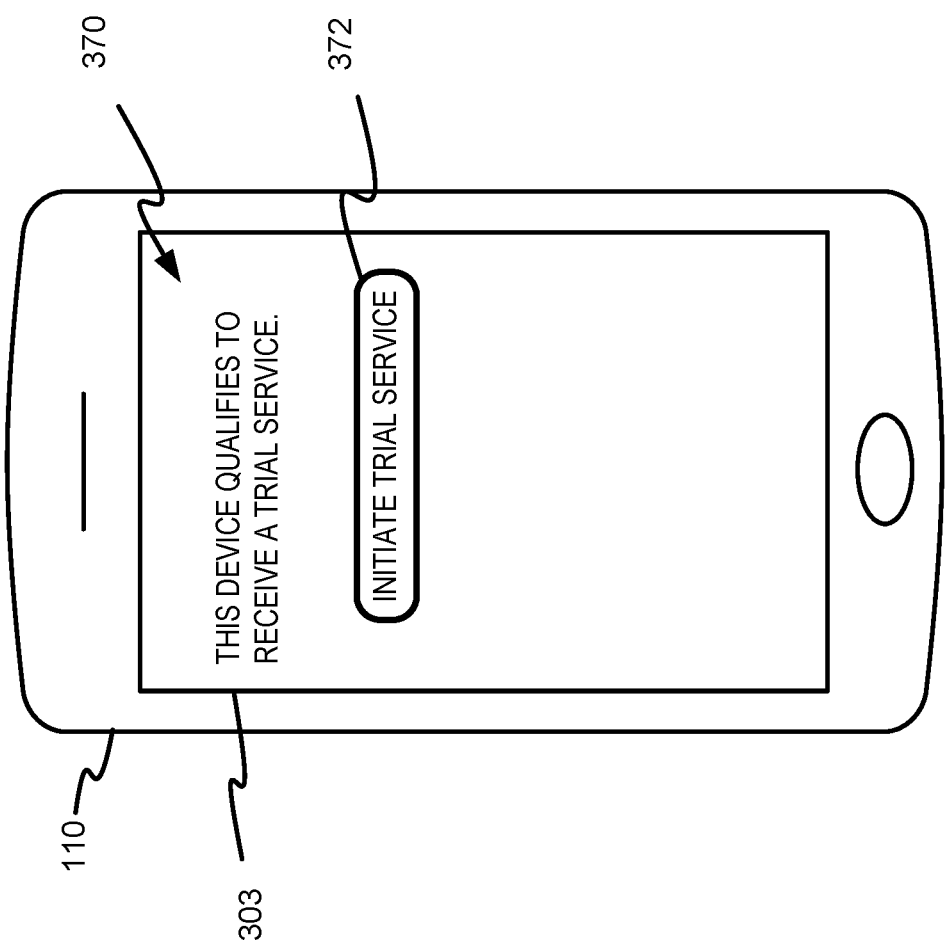

FIG. 3C shows an exemplary third display 303 that may be presented by user device 110 based on determining that user device 110 is approved to receive trial service 101. Third display 303 may include an offer 370 for trial service 101 and may include an acceptance graphical element 372 that may be selected by user device 110 (e.g., based on a receiving a corresponding user input) to accept offer 370 (e.g., to initiate provisioning of trial service 101). In one example, offer 370 may be included a text message received from web server 130. Third display 303 may be presented by user device 110 based on web server 130 verifying a request for trial service 101 (e.g., verifying trial service request 102). For example, third display 303 may be presented by user device 110 when the user correctly enters confirmation code 352 in response to request 360 in second display 302.

In one implementation, third display 303 may be presented to offer trial service 101 to user device 110 without user device 110 receiving a user input requesting trial service 101. For example, service client 114 may automatically determine that user device 110 is eligible for trial service 101, and service client 114 may cause third display 303 to be presented when user device 110 based on determining that user device 110 is eligible for trial service 101. For example, service client 114 may cause third display 303 to be presented when user device 110 is initially activated and/or when service client 114 verifies that the associated user is eligible to receive trial service 101.

Figure 3D:
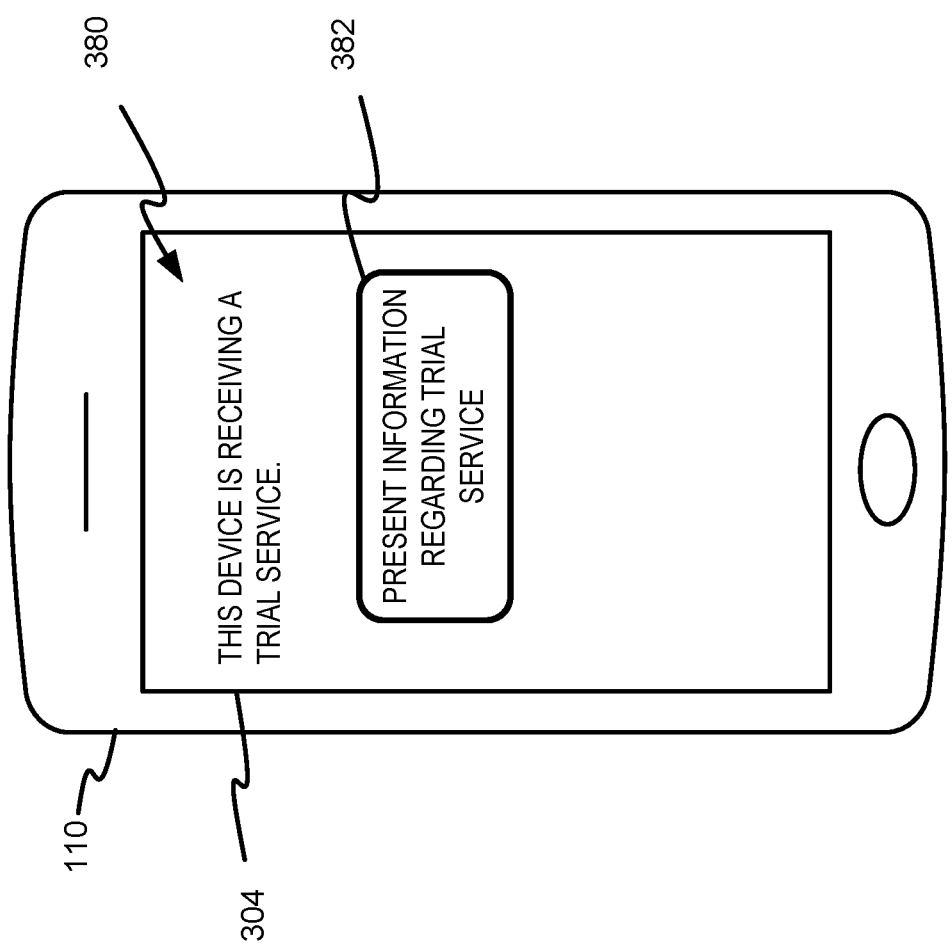

FIG. 3D shows an exemplary fourth display 304 that may be presented by user device 110 in one implementation in which trial service 101 is automatically provisioned to user device 110. For example, fourth display 304 may be presented by user device 110 when trial service 101 is provisioned without user device 110 receiving a user input requesting trial service 101. For example, service client 114 may automatically initiate provisioning of trial service 101 when service client 114 verifies user device 110 is compatible with trial service 101 and when an associated user is eligible to receive trial service 101. Service client 114 may further automatically initiate provisioning of trial service 101 based on determining that network 120 has sufficient capacity to support an additional trial servicer 101 to user device 110. Fourth display 304 may include an activation notification 380 for trial service 101 and may include an information request graphical element 382. Selection of information request graphical element 382 may cause fourth display 304 to present information regarding trial service 101, such as a details of trial service 101, a preview of user device 110 receiving trial service 101, such as second representation 366 (FIG. 3B).

Figure 3E:
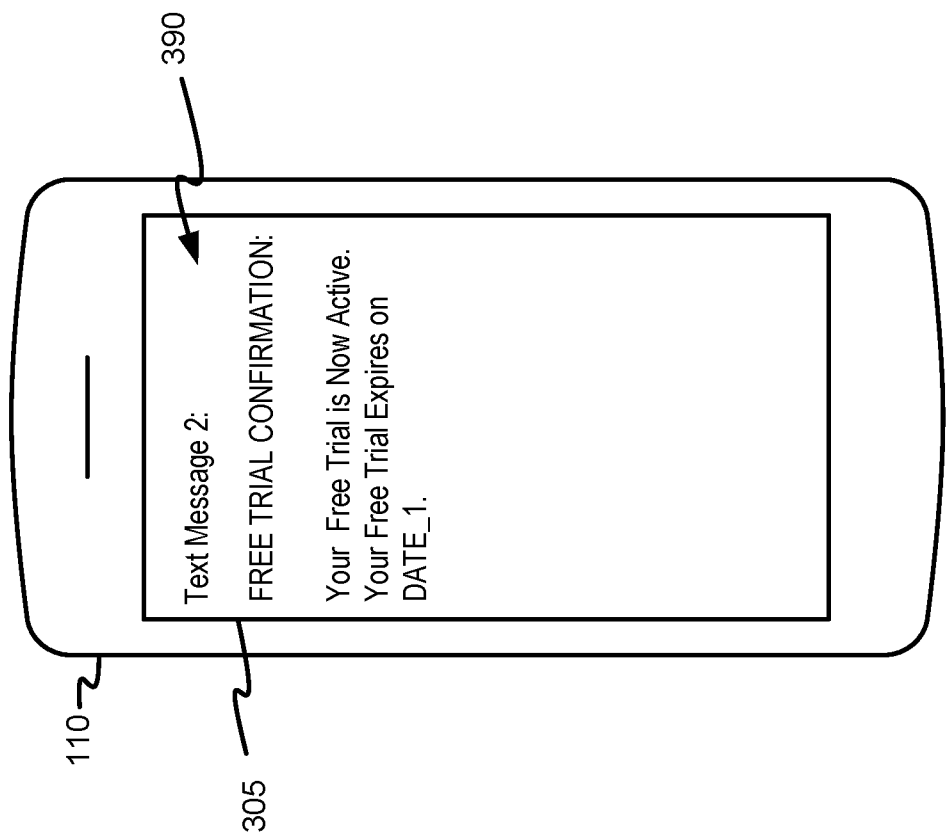

FIG. 3E shows an exemplary fifth display 305 that may be presented by user device 110 based on provisioning trial service 101. For example, fifth display 305 may be presented by user device 110 based on receiving a user input related to a selection of graphical element 372 (FIG. 3C). In another example, fifth display 305 may be presented by user device 110 after presenting fourth display 304 (e.g., after determining to automatically provision trial service 101 to user device 110). As shown in FIG. 3E, fifth display 305 may include a second text message 390 indicating that trial service 101 is provisioned and available to user device 110.

Figure 3F:
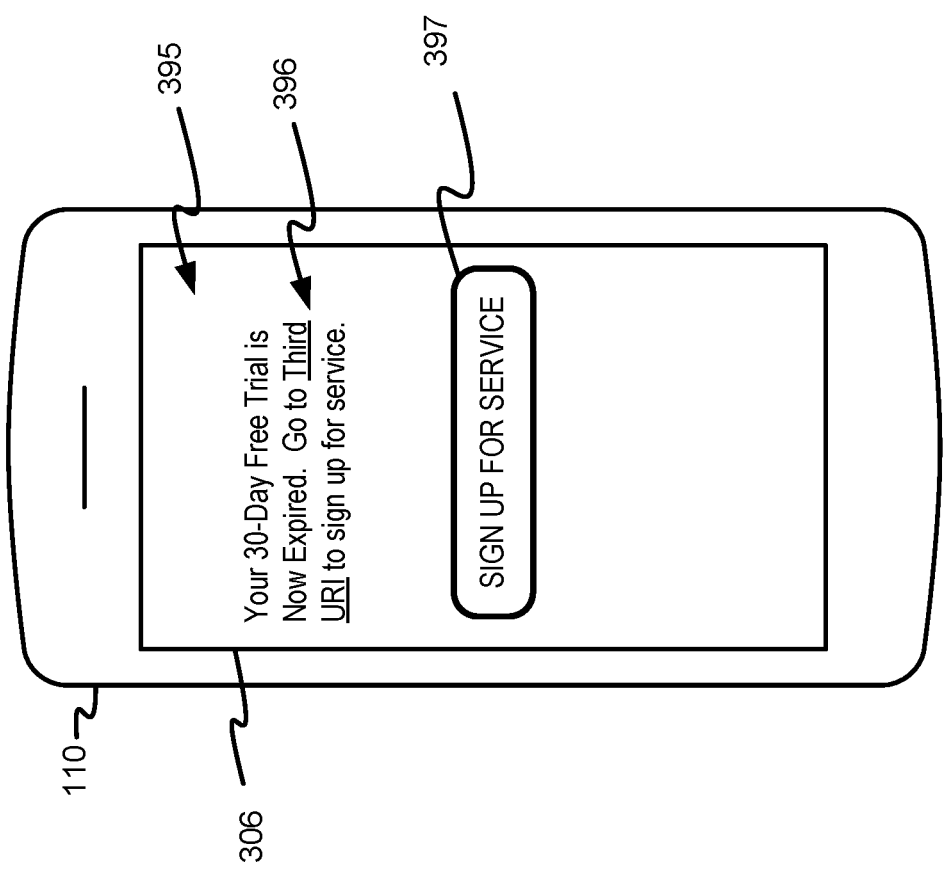

FIG. 3F shows an exemplary sixth display 306 that may be presented by user device 110 after trial service 101 expires. As shown in FIG. 3F, sixth display 306 may include a third text message 395. Third text message 395 may indicate that trial service 101 has expired. Third text message 395 may also include third URI 396 that may enable a user to access a web page to request a service corresponding to trial service 101 on a permanent basis (e.g., after trial service 101 has expired). As shown in FIG. 3F, sixth display 306 may further include a service request graphical element 397 that may enable the user to request an associated service on a permanent basis.

Although FIGS. 3A-3F show exemplary elements of displays 301-306, in other implementations, displays 301-306 may include fewer elements, different elements, differently arranged elements, or additional elements than those depicted in FIGS. 3A-3F. Alternatively, or additionally, one or more elements of one of displays 301-306 may include data described as being included in one or more other elements other displays 301-306.

FIG. 4 is flow chart of an exemplary process 400 for provisioning trial service 101. In one implementation, process 400 may be performed by one or more components of system 100, such as user device 110, web server 130, billing system 152, network provisioning system 154, or network service element 156.

As shown in FIG. 4, process 400 may include receiving from user device 110 (or another component of system 100) a request to provision trial service 101 (block 410). For example, user device 110 may forward a user-initiated request (e.g., based on a user selection related to an advertisement for trial service 101). Alternatively, the request for trial service 101 may be sent without user device 110 receiving a corresponding user input. For example, service client 114 may forward a request for trial service 101 when service client 114 is initially installed and/or user device 110 is initially activated. In another implementation, the request may be sent based on other factors, such as determining that user device currently uses or has previously used a related service (e.g., a basic service) at least a threshold number of times.

As further shown in FIG. 4, process 400 may include confirming that the request for trial service 101 is received from user device 110 (block 420). For example, as described above with respect to first display 301 in FIG. 3A, user device 110 receive first URL 310 that is only usable by user device 110, and user device 110 may use the first URL to access a web page used to submit data. The submitted data may be used to confirm that the request is received from user device 110 and is user-initiated (e.g., not caused by another device and/or malicious software operating on user device 110). If web server 130 cannot confirm that the request is received from user device (block 420—No), the request may be rejected (block 430). Additionally or alternatively, user device 110 may be asked to submit different and/or additional information if the request is rejected.

If the request for trial service 101 can be confirmed as being sent from user device 110 (block 420—Yes), web server 130 may send a request to authenticate the user device (block 440), and data regarding user device 110 and/or an associated user may be collected (block 450). For example, web server 130 may send authorization request 103 to device provisioning system 140, and device provisioning system 140 may send device/user data 104 to billing system 152. Device/user data 104 may be extracted from request 102 and/or may be obtained separately, such as from billing records or other account information.

As shown in FIG. 4, billing system 152 may determine, based on device/user data 104, whether to provision trial service to user device 110 (block 460). For example, billing system 152 may determine whether user device 110 is compatible with trial service 101 and whether a user associated with user device 110 has previously received trial service 101 (e.g., through a different user device). Billing system 152 may send provisioning result 105 to network provisioning system 154 based on the determination in block 460. Network provisioning system 154 may forward further notification data 106 to user device 110 based on the determination in block 460. If billing system 152 determines, based on device/user data 104, that user device 110 is eligible to receive trial service 101 (block 460—Yes), notification data 106 may indicate that user device 110 is eligible to receive trial service 101 (block 480). Network provisioning system 154 may further send provisioning command 107 that causes network service element 156 to provide trial service 101 to user device 110 (block 490). If billing system 152 determines to not provision trial service 101 to user device 110 (block 460—No), notification data 106 may indicate that user device 110 is not eligible to receive trial service 101 (block 470)

As further shown in FIG. 4, trial service 101 may expire after an associated trial period, and the user device 110 may receive an offer to provision the service on a permanent basis (block 495). For example, as shown in FIG. 3F, user device 110 may provide sixth display 306 indicating that trial service 101 has expired and may include a link or other information that may be used by user device 110 to continue to receive the service associated with the trial. Trial service 101 may expire automatically (without a request from user device 110) at the end of the trial time period. For example, provisioning command 107 may instruct network service element 156 to end trial service 101 at a particular time.

FIG. 5 is a flow chart of an exemplary process 500 for determining whether to provision trial service 101 to user device 110, such as block 460 of process 400. In one implementation, process 500 may be performed by one or more components of system 100, such as user device 110, web server 130, billing system 152, network provisioning system 154, or network service element 156. Process 500 is described with respect to determining whether to provision a trial service 101 related to an upgraded service when the user device 110 may already receive a basic level of service. In another implementation, process 500 may be applied to determining whether to provision a trial service 101 related to initially provisioning a service to user device 110.

As shown in FIG. 5, process 500 may include determining a class of service being provisioned to user device 110 before trial service 101 is provisioned (block 510). If user device 110 is already receiving a service offered through trial service 101 (block 510—Premium) or user device 110 is not receiving a service that can be upgraded to the trial service 101 (block 510—No Service), no action is taken and trial service 101 is not provisioned to user device 110 (block 550). A basic service may include, for example, receiving certain types of data and/or receiving a certain amount of data, and the premium service may include receiving additional types of data, additional amounts of data (e.g., higher data capacity), higher bandwidth, etc.

Otherwise, if user device 110 is originally receiving a basic service that is upgradeable to trial service 101 (block 510—Basic), billing system 152 may determine whether user device 110 is eligible to receive the premium service (block 520). For example, billing system 152 may determine whether user device 110 is compatible with the premium service 101. Billing system 152 may further determine whether a user associated with user device 110 is authorized to accept trial service 101. For example, billing system 152 may determine whether the user is a residential customer with authority to accept trial service 101 (e.g., whether the user is authorized to modified terms of service associated with user device 110) or is a business customer who is not authorized to modify services provided to user device 110. If user device 110 is not eligible to receive the premium service (block 520—No), no action is taken, and the premium service is not provisioned to user device 110 (block 550).

If user device 110 is eligible to receive the premium service (block 520—Yes), billing system 152 may determine whether user device 110 is eligible to receive the premium service in connection with trial service 101 (block 530). For example, billing system 152 may determine whether user device 110 has previously received trial service 101 and/or has not received trial service 101 during a particular prior time period (e.g., the last six months). Additionally or alternatively, billing system 152 may determine whether the associated user has previously received trial service 101 on another device.

If user device 110 is eligible to receive trial service 101 (block 530—Yes), billing system 152 may initiate the provisioning of trial service 101 to user device 110 (block 540). For example, billing system 152 may forward service class change request 111 to network provisioning system 154. Otherwise, if user device 110 is not eligible to receive trial service 101 (block 530—No), billing system 152 may cause an offer for the premium service to be provided to user device 110 (block 560).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Also, while a series of blocks has been described with respect to processes 400 and 500 in FIGS. 4 and 5, the order of the blocks in processes 400 and 500 may be modified in other implementations to include additional, fewer, and/or different blocks. Furthermore, non-dependent blocks in processes 400 and 500 may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used.

Further, the phrase "based on" is intended to mean "based, at least in part, on" unless explicitly stated otherwise.

What is claimed is:

1. A method comprising:
receiving, by a network device, a request to provision a trial service to a user device, wherein the trial service includes providing a premium service to the user device during a trial period;
identifying, by the network device, a non-premium service that is currently provided to the user device;
determining, by the network device, whether the user device is eligible to receive the premium service;
determining, by the network device and when the user device is eligible to receive the premium service, whether the user device is eligible to receive the trial service; and
providing, to the user device by the network device and based on determining that the user device is eligible to receive the trial service, a dynamic functional preview graphic of the trial service, wherein the dynamic functional preview graphic includes a concurrent presentation of:
an offer message including a confirmation code for initiating the trial service,
a user input field for entry of the confirmation code to initiate the trial service,
a first image representation of the user device including a first graphical representation of a user interface of the user device indicating a manner in which the user device functions when the premium service is activated, and
a second image representation of the user device including a second graphical representation of the user interface of the user device indicating a manner in which the user device functions when the premium service is not activated, wherein a dynamic visual difference between the first image representation and the second image representation demonstrates a corresponding functional difference between the premium service and the non-premium service.

2. The method of claim 1, wherein the first image representation and the second image representation are presented side-by-side to demonstrate the dynamic visual and corresponding functional differences.

3. The method of claim 1, wherein the request is automatically sent from the user device when the user device is initially activated.

4. The method of claim 1, wherein determining that the user device is eligible to receive the premium service includes:
determining that the user device is compatible with the premium service.

5. The method of claim 1, wherein determining whether the user device is eligible to receive the trial service includes:
identifying a user associated with the user device; and
determining that the trial service has not been previously provisioned to either the user device or another device of the user.

6. The method of claim 1, wherein determining whether the user device is eligible to receive the trial service includes:
identifying a user associated with the user device; and
determining whether the user is authorized to receive the premium service.

7. A device comprising:
a communication interface;
a memory configured to store instructions; and
a processor configured to execute the instructions to:
receive, via the communication interface, a request to provision a trial service to a user device, wherein the trial service includes providing a premium service to the user device during a trial period;
identify a non-premium service that is currently provided to the user device;
determine whether the user device is eligible to receive the premium service;
determine, when the user device is eligible to receive the premium service, whether the user device is eligible to receive the trial service; and
provide, to the user device and based on determining that the user device is eligible to receive the trial service, a dynamic functional preview graphic of the trial service, wherein the dynamic functional preview graphic includes a concurrent presentation of:
an offer message including a confirmation code for initiating the trial service,
a user input field for entry of the confirmation code to initiate the trial service,
a first image representation of the user device including a first graphical representation of a user interface of the user device indicating a manner in which the user device functions when the premium service is activated, and
a second image representation of the user device including a second graphical representation of the interface of the user device when the premium service is not activated, wherein a dynamic visual difference between the first image representation and the second image representation demonstrates a corresponding functional difference between the premium service and the non-premium service.

8. The device of claim 7, wherein the processor is further configured to execute the instructions to:
cease the premium service to the user device after the trial period; and
forward, to the user device, an offer to continue the premium service to the user device after the trial period.

9. The device of claim 7, wherein the processor is further configured to execute the instructions to:
present the first image representation and the second image representation side-by-side to demonstrate the dynamic visual and corresponding functional differences.

10. The device of claim 7, wherein the request is sent from the user device when the user device is initially activated.

11. The device of claim 7, wherein the processor, when determining whether the user device is eligible to receive the premium service, is further configured to execute the instructions to:
determine whether the non-premium service provided to the user device can be upgraded to the premium service.

12. The device of claim 7, wherein the processor, when determining that the user device is eligible to receive the trial service, is further configured to execute the instructions to:
identify a user associated with the user device; and
determine that the trial service has not been previously provisioned to either the user device or another device of the user associated with the user device during a particular time period.

13. A non-transitory computer-readable medium to store instructions, wherein the instructions, when executed by a processor associated with a device, cause the processor to:
receive, via a communication interface, a request to provision a trial service to a user device, wherein the trial service includes providing a premium service to the user device during a trial period;
identify a non-premium service provided to the user device;
determine whether the user device is eligible to receive the premium service;
determine, when the user device is eligible to receive the premium service, whether the user device is eligible to receive the trial service; and
provide, to the user device and based on determining that the user device is eligible to receive the trial service, the trial service to the user device, a dynamic functional preview graphic of the user device receiving the trial service to the user device, wherein the dynamic functional preview graphic includes a concurrent presentation of:
an offer message including a confirmation code for initiating the trial service,
a user input field for entry of the confirmation code to initiate the trial service,
a first image representation of the user device including a first graphical representation of a user interface of the user device indicating a manner in which the user device functions when the premium service is activated, and
a second image representation of the user device including a second graphical representation of the interface of the user device when the premium service is not activated, wherein a dynamic visual difference between the first image representation and the second image representation demonstrates a corresponding functional difference between the premium service and the the non-premium service.

14. The non-transitory computer-readable medium of claim 13, wherein the instructions further cause the processor to:
terminate the premium service to the user device after the trial period; and
forward, to the user device, an offer to continue the premium service to the user device after the trial period.

15. The non-transitory computer-readable medium of claim 13, wherein the instructions further cause the processor to:
present the first image representation and the second image representation side-by-side to demonstrate the dynamic visual and corresponding functional differences.

16. The non-transitory computer-readable medium of claim 13, wherein the request is sent from the user device when the user device is initially activated.

17. The non-transitory computer-readable medium of claim 13, wherein the instructions, when causing the processor to determine whether the user device is eligible to receive the premium service, further cause the processor to:
determine whether the non-premium service provided to the user device can be upgraded to the premium service.

18. The non-transitory computer-readable medium of claim 13, wherein the instructions, when causing the processor to determine that the user device is eligible to receive the trial service, further cause the processor to:
identify a user associated with the user device; and
determine that the trial service has not been previously provisioned to either the user device or another device of the user associated with the user device during a particular time period.

19. The non-transitory computer-readable medium of claim 13, wherein the instructions, when causing the processor to determine whether the user device is eligible to receive the premium service, further cause the processor to:
determine that the user device is compatible with the premium service.

20. The non-transitory computer-readable medium of claim 13, wherein the instructions, when causing the processor to determine whether the user device is eligible to receive the premium service, further cause the processor to:
identify a user associated with the user device; and
determine whether the user is authorized to receive the premium service.

* * * * *